United States Patent [19]
Futral

[11] Patent Number: 6,112,263
[45] Date of Patent: Aug. 29, 2000

[54] METHOD FOR MULTIPLE INDEPENDENT PROCESSES CONTROLLING ACCESS TO I/O DEVICES IN A COMPUTER SYSTEM

[75] Inventor: William T. Futral, Portland, Oreg.

[73] Assignee: Intel Corporation, Santa Clara, Calif.

[21] Appl. No.: 08/990,824

[22] Filed: Dec. 15, 1997

[51] Int. Cl.[7] .................................................. G06F 13/14
[52] U.S. Cl. ............................. 710/37; 710/40; 710/42; 709/229; 713/201
[58] Field of Search ................................. 713/200, 201, 713/202; 710/40, 42, 37; 709/229

[56] References Cited

U.S. PATENT DOCUMENTS

| | | | |
|---|---|---|---|
| 5,414,852 | 5/1995 | Kramer et al. ........................... | 709/104 |
| 5,552,776 | 9/1996 | Wade et al. .......................... | 340/825.31 |
| 5,627,967 | 5/1997 | Dauerer et al. ........................... | 713/202 |
| 5,675,782 | 10/1997 | Montague et al. ....................... | 713/201 |
| 5,774,650 | 6/1998 | Chapman et al. ....................... | 713/200 |

Primary Examiner—Thomas C. Lee
Assistant Examiner—Albert Wang
Attorney, Agent, or Firm—Steven P. Skabrat

[57] ABSTRACT

An I/O device driver is shared between a number of processes within a computer system while security and protection for system memory is maintained. Controlled access to the I/O device is provided by managing an authorized list in an I/O processor which is used to keep track of users of the I/O device according to types of claims for access to the I/O device. Claim types include primary, authorized, secondary, and management.

28 Claims, 6 Drawing Sheets

METHOD FOR MULTIPLE INDEPENDENT PROCESSES CONTROLLING ACCESS TO I/O DEVICES IN A COMPUTER SYSTEM

BACKGROUND OF THE INVENTION

1. Field of the Invention

The present invention relates generally to computer systems and more specifically to the control of input/output (I/O) devices for processing I/O transactions by multiple processes in a computer system.

2. Description of Related Art

Current I/O technology for computer systems provides for a single I/O device driver program controlling an I/O device, with that I/O device driver executing as a component of operating system (OS) software solely within the OS environment on a computing platform. The OS directly controls I/O transactions between the I/O device and an associated I/O unit's physical memory. An I/O unit typically includes one or more I/O platforms, wherein each I/O platform includes a processor, memory, I/O adapters, and I/O devices, and is managed independently from other processors within the computer system solely for processing I/O transactions. To initiate a data transfer, the OS specifies a physical address within the I/O unit's physical address domain. The OS regulates all access to the I/O device driver as a single source for I/O requests for use of the driver. In more sophisticated systems having multiple OS instances, ownership of the I/O device is passed from OS to OS, but each OS retains its own I/O device driver for the I/O device.

An advance in I/O system architecture design is the Intelligent I/O (I2O) architecture. The I2O architecture is a software specification designed to facilitate intelligent I/O subsystems which increase system scalability and availability, thereby allowing more users to be supported on a single server. These intelligent I/O subsystems allow I/O interrupts, such as those generated by networking and storage transactions, to be handled in the I/O subsystem, freeing the host processor to perform application processing tasks. With the advent of I2O subsystems as defined by the I2O architecture specification, there is a need for multiple independent control of I/O devices to support peer-to-peer and clustering concepts where a number of different platforms, each with their own instance of an operating system, require access to the same I/O device.

SUMMARY OF THE INVENTION

An embodiment of the present invention is a method for controlling multiple independent accesses to an I/O device including building a list of users authorized to access the I/O device, sending a claim by a user for permission to access the I/O device, accepting the claim for permission to access the I/O device when the user is an authorized user according to the list, and accepting requests for I/O operation from the authorized user.

BRIEF DESCRIPTION OF THE DRAWINGS

The features and advantages of the present invention will become apparent from the following detailed description of the present invention in which.

DETAILED DESCRIPTION OF THE PRESENT INVENTION

Figure 1:
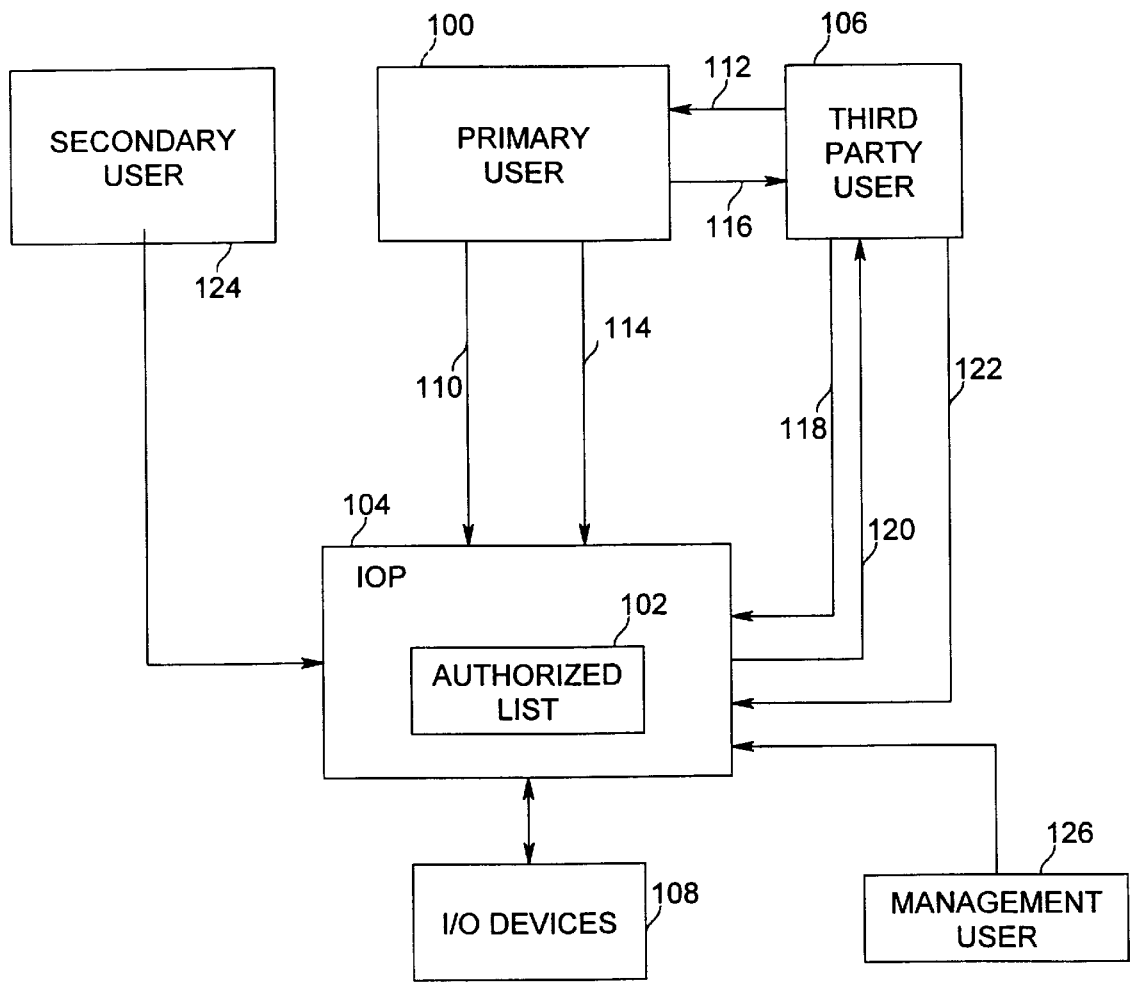
FIG. 1 is a diagram of a primary user controlling access by a third party user to an I/O device according to the present invention.

The present invention expands the split I/O driver concepts developed as part of the Intelligent I/O (I2O) Architecture Specification to provide for multiple independent users of an I/O device. Under the I2O architecture, I/O device drivers no longer execute as a component of the OS (i.e., in the OS environment). The present invention allows the I/O device driver to be shared between a number of instances of the same OS, as well as agents of an OS, while still maintaining security and protection for system memory by providing controlled access to the I/O device.

Embodiments of the present invention provide a mechanism by which multiple, independent processes being executed by one or more processors in a computer system can access any I/O device within an I/O Processor (IOP) in a controlled and secure manner. The present invention includes an enhanced process for claiming access to an I/O device. It provides for a single OS or its agent to become a primary user of the I/O device and thus responsible for its overall management and control. The present invention provides for authorized users that can take on the same responsibilities as the primary user but only with the express permission of the primary user; secondary users that function independently of the primary user; and management users that are restricted to orthogonal management capabilities. The term "user" here means a process being executed by a processor somewhere within the computer system. Users may be distributed across multiple processors within the computer system.

The primary user establishes executive control over the I/O device. Thus, there can only be one primary user per I/O device. Three other user types enable the use of multiple host processors (for clustered operation), peer-to-peer communications, and system management.

Management User

Passive management users do not alter an I/O device's parameters and therefore do not need to claim I/O devices. An example of a passive management user is a process that collects statistics from the I/O device relating to I/O operations. Active management users, however, must claim I/O devices in order to change the I/O device's operating characteristics. A conflict arises if both a management user and the primary user modify the same parameter for the I/O device. Each I/O class definition identifies which parameters are allowed to be modified by a management user. Management users are not permitted to send base class commands (that is, actual I/O instructions to read or write I/O data) to an I/O device.

Authorized User

The primary user may authorize additional users to operate on its behalf and with the same level of control, allowing the authorized users to send base class commands to the I/O device. The extent of control that an authorized user possesses is privately defined by the primary user. How the primary user determines authorized users varies depending on the application program. The I/O device being claimed assumes that an authorized user has the same rights as the primary user. Authorized users are affirmed by the primary user. The authorized user category gives the primary user explicit control over which processes and devices in the computer system can access the services of the claimed I/O device. The authorized user category is useful for clustered server environments, redundant hosts, and for peer-to-peer I/O communication.

Secondary User

In cases where the primary user may not wish to expressly authorize each additional user, it can enable the claimed I/O device for secondary service. Secondary service is a less restrictive form of accessing the I/O device than authorized service. In certain environments, using secondary service avoids close coupling of the IOP with the primary user and opens up the I/O device for general, unrestricted access. Base class definitions specify which base class instructions are not permitted to be sent by a secondary user to an I/O device. Base class instructions are those instructions, such as I/O reads and I/O writes, that control how the I/O device performs an I/O operation. A secondary user may send any permitted base class instruction, but it cannot modify operational parameters of the I/O device. The operation of secondary users is transparent to the primary user. The secondary user category is useful for peer-to-peer I/O communication.

The present invention defines an explicit claim sequence that arbitrates for the primary user and permits the primary user to establish the sharing policies of the I/O device (i.e., the mechanism for excluding the secondary users and management users). This process defines the mechanism for specifying authorized users for the I/O device.

The first user that successfully claims the status of primary user becomes the primary user and all other attempts to claim primary user status fail. Therefore, only one user can believe that it is the primary user. As part of the claim, the primary user sets the sharing policy for the I/O device that either permits or inhibits secondary users and also sets the sharing policy that either permits or inhibits management users. If a type of user is inhibited, a user claiming as that type (i.e., secondary or management) has its claim rejected. Before a user sends base class messages (e.g., I/O instructions) or modifies operating parameters of the I/O device, it must first successfully claim the right to do so. Therefore, a user never operates as if it has access rights which it does not actually have according to the present invention.

The primary user explicitly enables authorized users by instructing the IOP to build a list of authorized users for the I/O device. This list is called the Authorized List. It resides in the IOP's memory. There is one Authorized List for each I/O device. When the primary user successfully claims the I/O device, the I/O device creates a list of authorized users that contains only the primary user. Only an authorized user can modify the list. Therefore, the primary user inhibits any user from becoming an authorized user by doing nothing. By adding a user to the Authorized List, the primary user authorizes the I/O device to allow that user the same privileges as the primary user.

FIG. 1 is a diagram of a primary user controlling access by a third party user to an I/O device according to the present invention. The primary user establishes the environment in which an I/O device will work. The present invention includes a Primary User 100 which controls the building and maintenance of an Authorized List 102 in IOP 104 for one of the I/O Devices 108, thereby allowing Third Party User 106 to send I/O requests directly to the IOP and have data sent directly back to the Third Party User without going through the Primary User, provided that the Third Party User is in the Authorized List. Primary User 100 controls access to the Authorized List 102 and can therefore include or exclude users in the system environment from accessing one of the I/O Devices 108. Primary User 100 and Third Party User 106 are processes which may be executing on the same processor or server, but typically will be processes executing on different processors or servers within a computer system environment. Only one Third Party User 106 is depicted in FIG. 1, but many third party users requiring access to a selected I/O Device may be simultaneously active in the computer system.

Initially, a user sends a claim request to IOP 104 claiming primary ownership of a selected one of the I/O Devices 108. This claim request is represented as flow 110 on FIG. 1. If no other user has previously claimed and retained ownership of the selected I/O Device, this user becomes its Primary User 100. At any point in time after ownership of the I/O Device has been established, Third Party User 106 may require use of the I/O Device. Third Party User 106 then informs the Primary User of the need for accessing the I/O Device by sending a message (represented as flow 112) to the Primary User 100. The Primary User sets up the authorization for the Third Party User to access the selected I/O Device by sending an I/O management message shown as flow 114 to the IOP 104. The I/O management message instructs the IOP to add the Third Party User to the Authorization List 102 for the selected I/O Device. Access to the I/O Device is thereby granted by the Primary User to the Third Party User according to the parameters established in messages 110 and 114, and acknowledged by the Primary User in message 116 sent to the Third Party User.

Next, the Third Party User sends a claim request to the IOP (flow 118) identifying the Third Party User as an authorized user of the I/O Device. The IOP 104 verifies that the Third Party User is authorized to use the I/O Device by checking the Authorization List 102. If access is permitted, then a communications connection is set up between the Third Party User 106 and the IOP 104 and an acknowledgment to proceed message 120 is sent from the IOP to the Third Party User. This establishes the right of the Third Party User to send base class instructions (such as those requesting reading and writing of I/O data) to the I/O Device without going through Primary User 100. The Third Party User then sends base class messages to the IOP via flow 122. Without acceptable authorization for the Third Party User as maintained in the Authorization List, the IOP rejects base class messages from the Third Party User.

Other accesses to the I/O Device may be permitted under certain circumstances. A Secondary User 124 may gain access to an I/O Device if the Primary User 100 allows the IOP 104 to accept requests without explicit authorization. Hence, secondary means implied authorization in this context. To allow this secondary service, the Primary User instructs the IOP to do so during the primary claim request process described above. Subsequently, Secondary User 124 may attempt to access the I/O Device. If the Primary User has not authorized this class of service, then the claim request from the Secondary User is rejected by the IOP. If this class of service has been authorized, then the claim request is accepted and the Secondary User can send base class instructions directly to the I/O Device. This scenario allows for a bypass of the control requirements of the Primary User. Under a secondary user policy, a Secondary User is allowed to send base class instructions to the I/O Device.

A Management User 126 may gain access to an I/O Device if the Primary User allows the IOP to accept requests for management services. Under a management user policy, a Management User is allowed to send management class instructions to the I/O Device, but not base class instructions. For example, a management user may access gathered statistics accumulated by the IOP during I/O operations for a selected I/O Device, but it may not request I/O reads or I/O writes.

Thus, there are three main cases for access to the I/O Device. When the Authorization List is empty, no authorized or secondary service is available. Only the Primary User may access the I/O Device. When the Authorization List has entries, then the Third Party Users corresponding to those entries are authorized to send base class instructions to access the I/O Device. Finally, when a secondary user policy is established, any secondary user may send base class instructions to the I/O Device without explicit authorization. For each of the three cases, management users can request management class operations to be performed by the I/O Device.

Figure 2A:
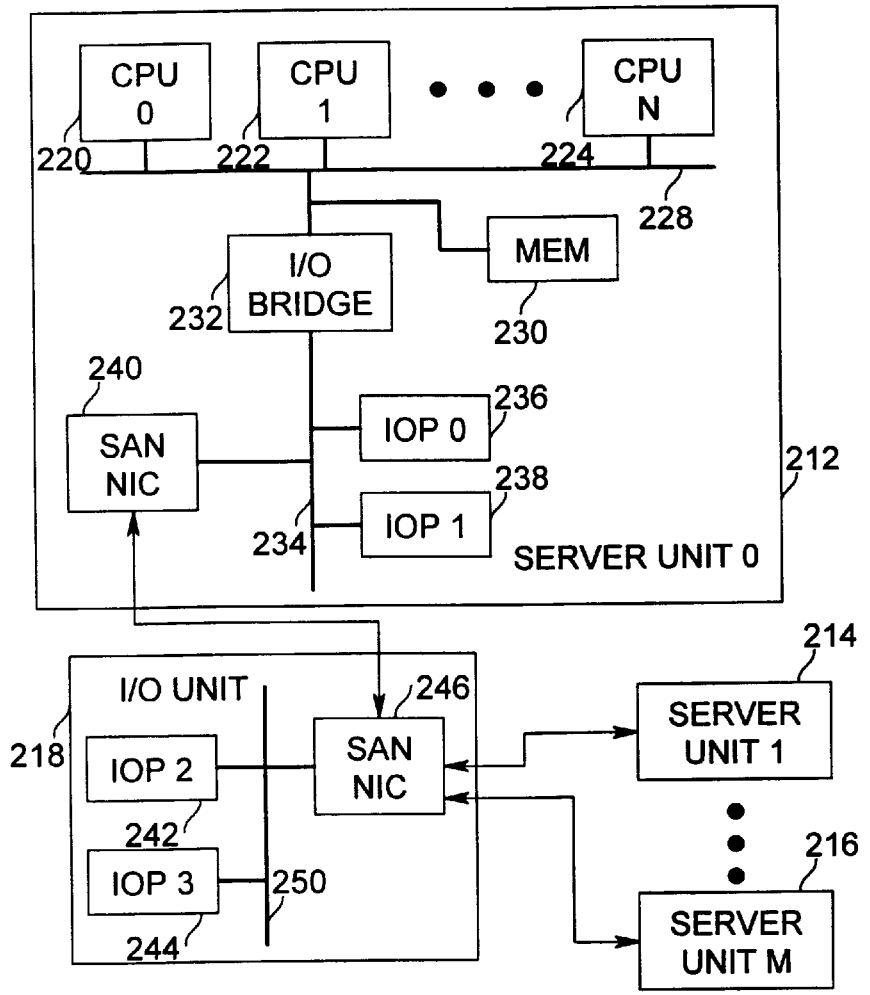
FIG. 2a is a diagram of the computer system environment of the present invention.

FIG. 2a is a diagram of the computer system environment of the present invention. The computer system 210 includes a plurality of server units, represented in FIG. 2a as Server Unit 0 212, Server Unit 1 214, through Server Unit M 216. A server unit is a compute node executing an appropriate high level operating system. One of the server units functions as the primary server and executes the Primary User process. Other server units execute processes for Third Party Users, Secondary Users, and Management Users. In the example shown in FIG. 2a, the servers are connected to an I/O Unit 218. The I/O Unit is coupled to a plurality of I/O devices (not shown). The I/O Unit is a collection of I/O processors that share the same physical address space. Server Unit 0 212 includes a plurality of central processing units (CPUs) shown as CPU 0 220, CPU 1 222, through CPU N 224. The CPUs execute instructions for programs such as operating system software and application programs. Operating system software includes a plurality of operating system modules (OSMs). An OSM is a driver program in a server that requests service of an I/O device. In the present invention, an OSM may be a primary, management, third party or secondary user. The CPUs are coupled to a Bus 228. The CPUs use the Bus to access main memory (MEM) 230 and an I/O Bridge 232. The I/O Bridge provides access to a second Bus 234. In one embodiment of the present invention, this second bus is a Peripheral Component Interconnect (PCI) bus. In one embodiment, Server Unit 0 includes one or more I/O processors (IOPs) represented in FIG. 2a as 236, 238. An IOP includes a processor, memory, I/O adapters, and I/O devices, and is managed independently from other processors within the computer system solely for processing I/O transactions. Each IOP has its own virtual address space, it can access it's I/O Unit's physical address space, and it can access remote memory through a remote transport agent (RTA) (not shown). A remote transport agent is a component in each IOP that controls a System Area Network (SAN) Network Interface Controller (NIC) to manage connections between the IOP and other platforms and provides transport services to exchange message services between various platforms.

Server Unit 0 212 also includes System Area Network (SAN) Network Interface Controller (NIC) 240. A SAN is a strategy for interconnecting nodes within a clustered computer system that employs a common administrative domain and hardware proximity to improve predictability of inter-node communication. A node is a computer or I/O unit attached by a NIC to one or more links of an interconnect fabric, and forming an origin and/or destination of messages within the interconnect fabric. A NIC provides an electro-mechanical attachment of a node to an interconnect fabric providing a unique, addressable origin and destination for messages traversing the network. Under program control, a NIC copies data from memory (MEM) 230 to the interconnect medium (packet transmission), and from the medium to memory (packet reception). The interconnect fabric is a collection of hardware elements, such as routers, switches, connectors, and cables, that inter-connect a set of nodes in a system. Hence, the SAN NIC provides connections to other platforms that are external to the local unit. The operation of the SAN NIC is abstracted by the Remote Transport Agent. A single SAN NIC may provide connections for a number of IOPs or each IOP might be served by a different SAN NIC. A SAN NIC 240 in one node of the system can communicate with a SAN NIC in another node of the system (such as Server Unit 1 214, Server Unit M 216, or I/O Unit 218). Note in the embodiment shown in FIG. 2a that all server units have access to I/O Unit 218.

I/O Unit 218 includes one or more IOPs. In the example of FIG. 2a, two IOPs, IOP 2 242 and IOP 3 244 are shown, but more IOPs can also be included in I/O Units. I/O Unit 218 includes SAN NIC 246 to communicate with the server units. All components within I/O Unit 218 are connected via internal Bus 250. Although only one I/O Unit is shown in FIG. 2a, in other embodiments, a plurality of I/O Units can be coupled to a plurality of server units.

Figure 2B:
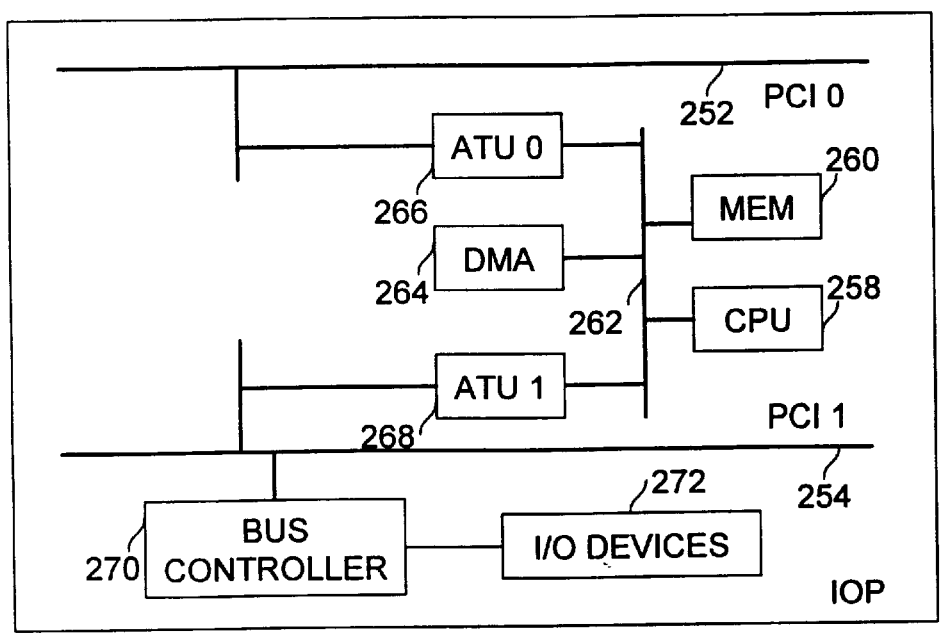
FIG. 2b is a diagram of an I/O Processor (IOP).

FIG. 2b is a diagram of an I/O Processor (IOP). In one embodiment, an IOP has PCI 0 252 and PCI 1 254 buses. The IOP has its own CPU 258 and memory (MEM) 260. The CPU executes instructions for managing I/O operations. CPU 258 and MEM 260 are coupled to a Bus 262, which also connects to a Direct Memory Access (DMA) device 264. Dual Address Translation Units (ATUs) 0 266 and 1 268 provide translation of physical addresses. A Bus Controller 270 provides access from PCI 1 bus 254 to selected I/O Devices 272 as required. Each IOP includes a number of software Device Driver Modules (DDMs) (not shown), with each DDM supporting at least one I/O Device. A DDM is a driver program executed by an IOP that provides I/O service to an OSM. Each DDM registers the I/O devices it controls. A DDM performs I/O (i.e., transfers data) between one of its I/O devices and a buffer located on a particular platform in the computer system environment. That platform might be the same IOP, another IOP in the same I/O Unit, an IOP in another I/O Unit, or a server.

Note that a server unit may contain a plurality of IOPs, a system may have a plurality of I/O Units accessible by the server units, and each I/O Unit may also contain a plurality of IOPs.

Figure 3:
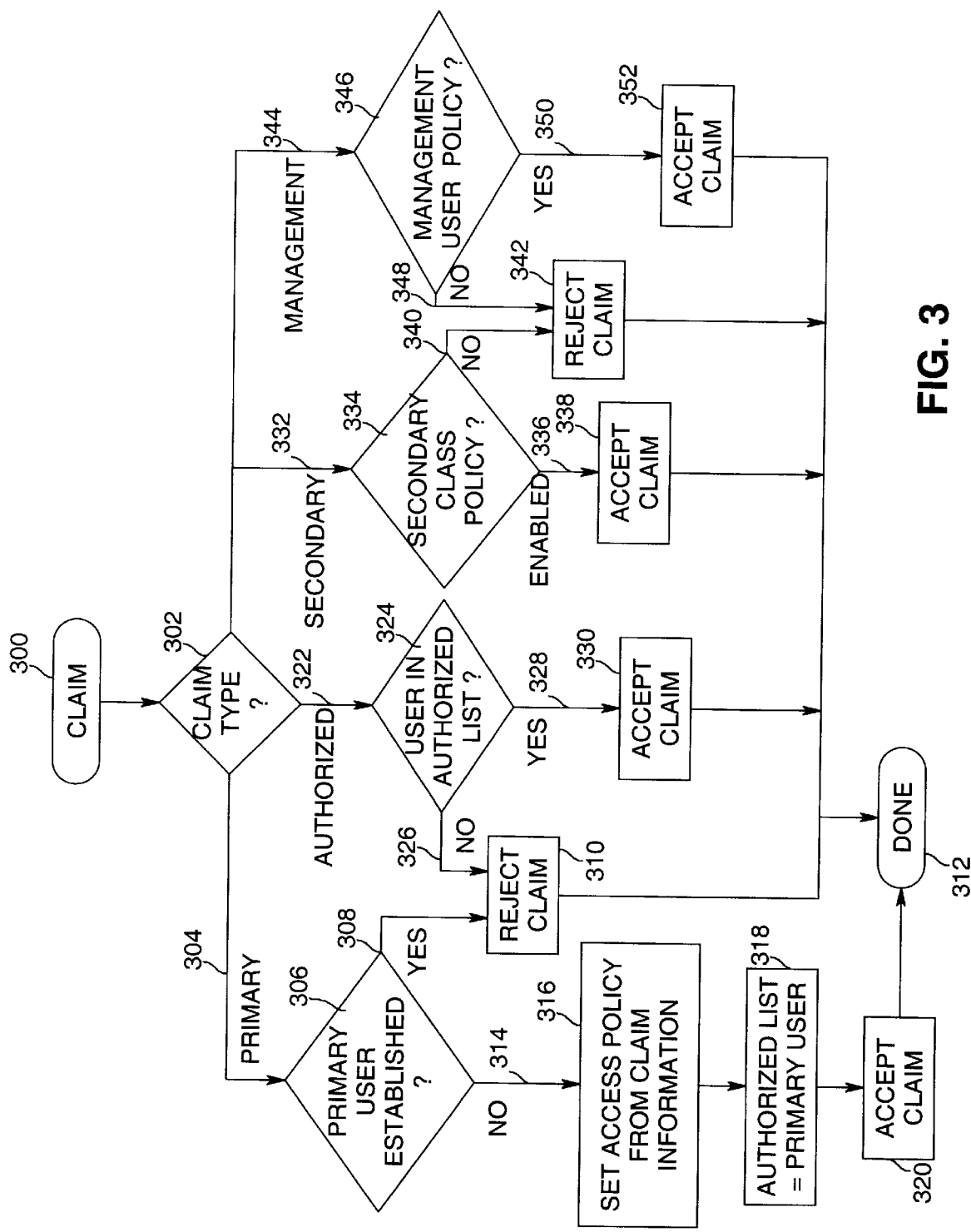
FIG. 3 is a flow diagram of the steps for claiming authorization to access an I/O device.

FIG. 3 is a flow diagram of the steps for claiming authorization of an I/O device. It describes the processing performed by the IOP to accept or reject claims for access to the I/O Device. After a claim 300 is sent by a process in the computer system, the claim type is determined at step 302. If the claim type is Primary, then path 304 is taken to step 306. At this step, it is determined if a primary user is established for this I/O device. If a primary user is already established, Yes path 308 is followed to step 310, where the claim is rejected. The claiming process then ends at done step 312. If a primary user is not yet established, then No path 314 is taken to assign the current user as the primary user. At step 316 the access policy is set from the information contained in the claim. The primary user is added to an otherwise empty Authorized List for this I/O device at step 318. The claim is then accepted at step 320 and claim processing ends at done step 312.

If the claim type at step 302 is Authorized, then path 322 is taken to step 324. An authorized claim is sent by a third party user which desires to access the I/O device. At step 324 it is determined if the user attempting to claim the I/O device is in the Authorized List. If the user is not in the Authorized List, then No path 326 is taken to step 310, where the claim is rejected. If the user is in the Authorized List, then Yes path 328 is taken to step 330, where the claim is accepted. The authorized third party user may now send base class instructions to the I/O device. If the claim type at step 302 is Secondary, path 332 is taken to step 334. At this step, a secondary user policy for this I/O Device is checked. If it is enabled, then Enabled path 336 is followed to step 338, where the claim is accepted, thereby allowing the secondary user tp send base class instructions to the I/O device. If it is not enabled, then No path 340 is taken to step 342, where the claim is rejected. If the claim type at step 302 is Management, path 344 is taken to step 346. At this step, a management user policy is checked. If the claim request does not conform to the management user policy, then No path 348 is taken to step 342, where the claim is rejected. Otherwise, Yes path 350 is taken to step 352, where the claim is accepted and processing ends at step 312. The management user can then send management instructions to the I/O device.

Figure 4:
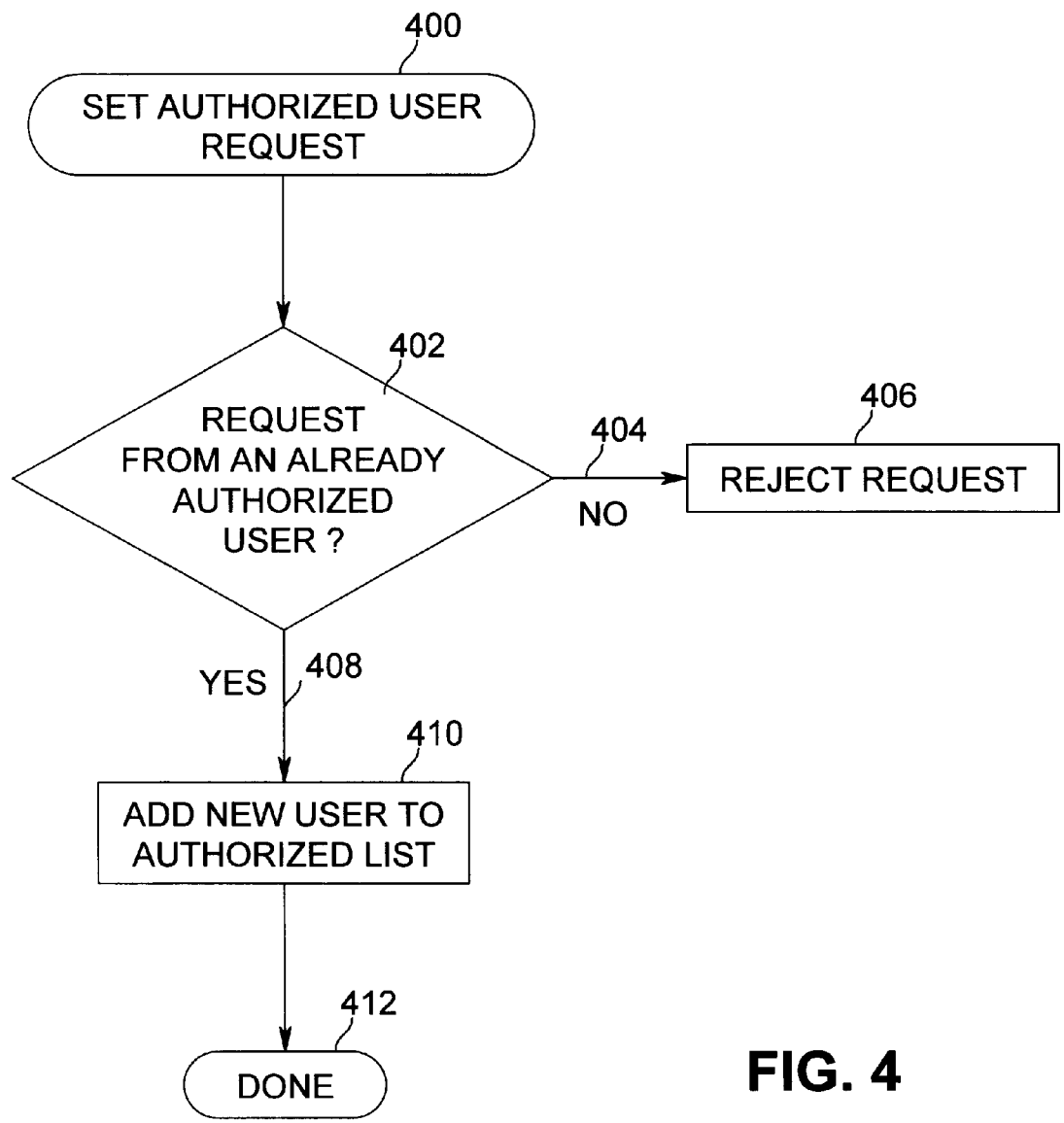
FIG. 4 is a flow diagram of the steps for building the Authorized List.

FIG. 4 is a flow diagram of the steps for building the Authorized List. The set authorized user request identifies the user making the request as well as the new user being authorized. The set authorized user request function 400 begins by determining if the request is received from an authorized user at step 402. If the request is not from an authorized user, then No path 404 is taken to step 406 where the request is rejected. If the request is from an authorized user, then Yes path 408 is taken to step 410, where the new user is added to the Authorized List. Processing ends at done step 412.

Figure 5:
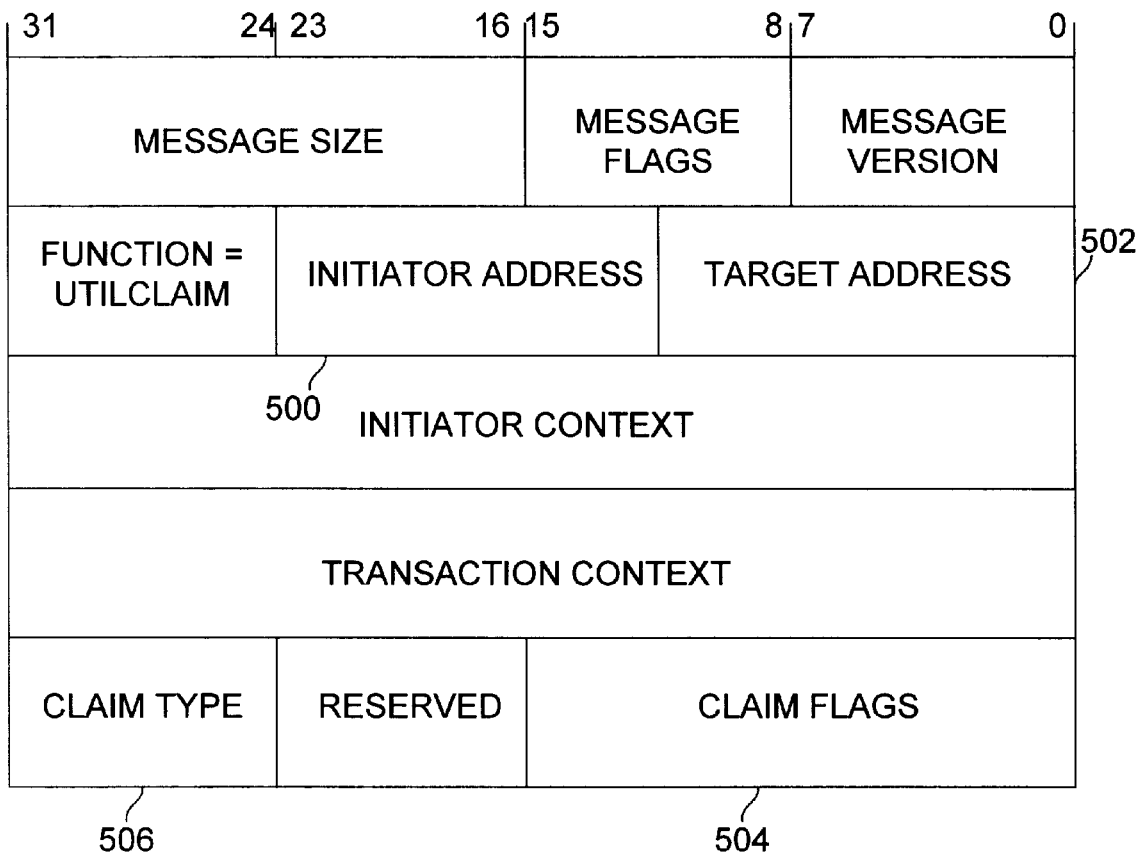
FIG. 5 is a diagram of the format of the claim for access to an I/O device.

FIG. 5 is a diagram of the format of the claim for access to an I/O device. The UtilClaim request notifies the recipient that the sender asks to use or manage the I/O device's base class functions. A successful reply indicates that the recipient will accept messages from the sender. The potential user identifies the type of control it requires as follows. In the simple model, an OS Service Module (OSM) is the primary user, and in the stacked driver model, an Intermediate Service Module (ISM) is the primary user. An OSM is an I/O device driver module that interfaces the host OS to the 120 message layer. In the split driver model, the OSM represents the portion of the driver that interfaces to host-specific application program interfaces (APIs), translating them to a neutral message-based format that goes to a hardware device module (HDM) for processing. An ISM is a stacked module that sits between an OSM and a HDM, providing some specialized I/O function.

The fields of the UtilClaim request are as follows. The Initiator Address 500 is the identifier of the user (that is, the sender) making the claim request. The Target Address 502 identifies the I/O device being claimed. Each bit of the Claim Flags 504 field represents a different claim attribute. The only bits that are defined are bits 0–5. Bit 0 is reserved. Bit 1 is the Reset Sensitive flag. Setting this bit indicates that the sender needs to synchronize with any resets of the I/O device. For such a reset, the recipient rejects any further base class requests from the sender until an appropriate UtilEventAck message is received. As an example, when a Small Computer System Interface (SCSI) bus reset is performed, all SCSI peripheral devices on that bus are reset. Each I/O device generates a DEVICE_RESET event to its users and rejects further messages until the reset is acknowledged. Bit 2 is the State Sensitive flag. Setting this bit indicates that the sender needs to synchronize with any state changes of the device (such as media or volume change of a storage device). If such a change occurs, the I/O device rejects any further base class requests from the sender until an appropriate UtilEventAck message is received. Bit 3 is the Capacity Sensitive flag. Setting this bit indicates that the sender needs to synchronize with any capacity changes of the I/O device. If such a change occurs, the I/O device rejects any further base class requests from the sender until it receives an appropriate UtilEventAck message. Bit 4 is the Secondary Service Class Disabled flag. The recipient rejects UtilClaim requests from secondary users when this bit is set. If a secondary user already claimed the I/O device, then the recipient rejects this request. This bit is only meaningful in the UtilClaim request from the primary user. If the recipient rejects the request because a secondary user already exists, the sender might consider sending an ExecDeviceRelease message. Bit 5 is the Management Service Class Disabled flag. The recipient rejects subsequent UtilClaim messages from management users when this bit is set. If a management user has already claimed the I/O device, then the recipient rejects this request. This bit is only meaningful in the UtilClaim request from the primary user. If the recipient rejects the request because a management user already exists, the sender might consider the ExecDeviceRelease message.

The Claim Type field 506 stores a value that represents the intent of the claiming entity. The Claim Type may be Primary User, Authorized User, Secondary User, or Management User. A device may have only one primary user. If a UtilClaim request indicates a primary user, but another user already claimed this device as a primary user, then the recipient rejects the request. If it accepts the request, it rejects subsequent UtilClaim requests indicating a primary user, until the primary user sends a UtilClaimRelease message. The primary user authorizes alternate users using a UtilParamsSet utility message. When a received UtilClaim request indicates an authorized user, the recipient verifies that the sender is authorized. If the sender is not authorized, then the recipient rejects the request. The sender rejects a UtilClaim request from a secondary user if the primary user disabled secondary service class processing. The recipient rejects a UtilClaim request from a management user if the primary user disabled management service class processing.

Figure 6:
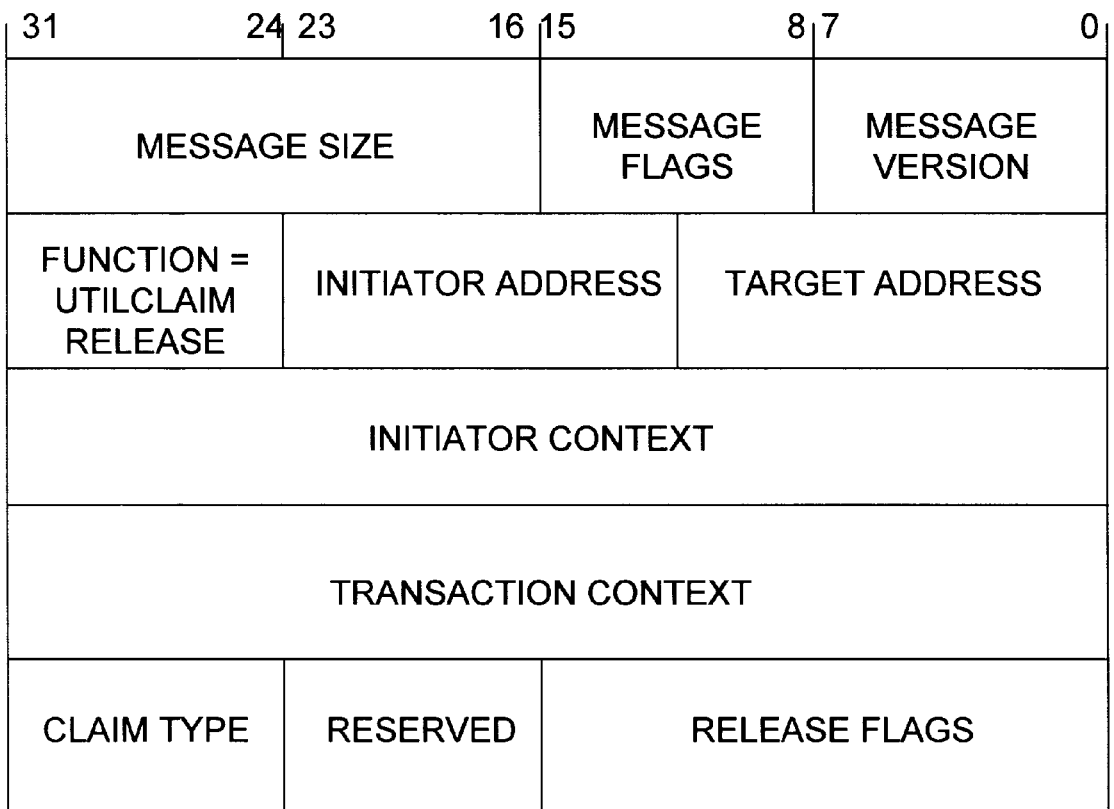
FIG. 6 is a diagram of the format of the request for release of a claim for access to an I/O device.

FIG. 6 is a diagram of the format of the request for release of a claim for access to an I/O device. The UtilClaimRelease function notifies the recipient that the sender releases its claim for access to the I/O device. The UtilClaimRelease message includes many of the same fields as the UtilClaim message, however, the Release Flags field 610 indicates release attributes. Bit 0 of the Release Flags field is a Conditional flag. It may only be set by the primary user. When the Conditional bit is set, a Device Driver Module (DDM) retains the Authorized List and rejects a primary claim unless it is from a user already specified in the list. If the primary user does not set this bit in its release, then the recipient clears the Authorized List and rejects base class messages until a primary user is established. When a primary user releases the claim, the recipient assumes that all authorized users are aware of the primary users relinquishing of control of the I/O Device.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of controlling multiple independent accesses to an I/O device, the I/O device being controlled by an I/O processor, the I/O processor being part of a system area network (SAN), comprising:
building a list of users authorized to access the I/O device from within the system area network;
sending a claim by a first user within the system area network for permission to access the I/O device;
accepting the claim for permission to access the I/O device when the first user is an authorized user according to the list; and
accepting requests for I/O operation from the authorized user by the I/O processor.

2. The method of claim 1 wherein the users comprise processes being executed by different processors in the system area network.

3. The method of claim 1 wherein the users comprise processes executing on different servers in the system area network.

4. The method of claim 1, further comprising rejecting the claim for permission to access the I/O device within the system area network when the first user is not an authorized user according to the list.

5. The method of claim 1, wherein the building step comprises accepting a claim for primary control of the I/O device from a second user and adding the second user as a primary user to the list.

6. The method of claim 5, wherein the accepting step further comprises accepting the claim for primary control of the I/O device if no previous primary claim has been received.

7. The method of claim 5, wherein the building step further comprises receiving, by the primary user, a request to be authorized to use the I/O device in the system area network from the first user and adding the first user to the list.

8. The method of claim 7, further comprising establishing a communications connection between the first user and the I/O device using a system area network (SAN) network interface controller (NIC) coupled to the I/O processor when the claim for access to the I/O device is accepted.

9. The method of claim 8, further comprising transferring data between the first user and the I/O device over the communications connection.

10. The method of claim 5, wherein the primary claim comprises an indication that access without explicit authorization to the I/O device within the system area network is allowed.

11. The method of claim 10, wherein the first user comprises a secondary user within the system area network and the accepting the claim for access step comprises accepting the claim for access to the I/O device by the secondary user without checking to determine if the secondary user is an authorized user in the list.

12. The method of claim 11, further comprising establishing a communications connection between the secondary user and the I/O device using a system area network (SAN) network interface controller (NIC) coupled to the I/O processor when the claim for access is accepted.

13. The method of claim 12, further comprising transferring data between the secondary user and the I/O device over the communications connection.

14. The method of claim 5, wherein the primary claim comprises an indication that management access to the I/O device is allowed.

15. In a system area network (SAN) having a primary user, a plurality of third party users, and an I/O device controlled by an I/O processor, the I/O processor including a list of users authorized to access the I/O device within the SAN, a method of controlling multiple independent accesses to the I/O device comprising:
sending a claim for primary control of the I/O device within the SAN by the primary user to the I/O processor;
adding the primary user to the list according to the primary claim;
sending a request to be authorized for access to the I/O device within the SAN from a third party user to the primary user;
adding the third party user as an authorized user to the list;
sending an authorized claim for access to the I/O device within the SAN from the third party user to the I/O processor;
accepting the authorized claim when the third party user is an authorized user according to the list; and
accepting requests for I/O operation from the third party user by the I/O processor.

16. The method of claim 15, wherein the primary user and third party users are processes being executed by different processors in the SAN.

17. The method of claim 16, wherein the primary user and third party users are processes executing on different servers in the SAN.

18. The method of claim 15, further comprising establishing a communications connection between the third party and the I/O device using a system area network (SAN) network interface controller (NIC) coupled to the I/O processor when the authorized claim is accepted.

19. The method of claim 18, further comprising transferring data between the third party user and the I/O device over the communications connection.

20. An apparatus for controlling multiple independent accesses to an I/O device, the I/O device being part of a system area network comprising:
an I/O processor managing access to the I/O device within the system area network and including a list of users authorized to access the I/O device, the I/O processor allowing access to the I/O device to authorized users;
a plurality of third party users requesting access to the I/O device;
a primary user to control access to the I/O device by instructing the I/O processor to modify the list by adding selected third party users as authorized users to the list; and
a system area network (SAN) network interface controller coupled to the I/O processor to manage a data transfer connection between the I/O Processor and at least one third party user when the at least one third party is an authorized user of the I/O device.

21. The apparatus of claim 20, wherein the third party users and the primary user are processes being executed by different processors within the system area network.

22. The apparatus of claim 20, wherein the third party users and the primary user are processes executing on different servers within the system area network.

23. The apparatus of claim 20, further comprising at least one secondary user, wherein the secondary user accesses the I/O device without being on the list when the primary user instructs the I/O processor to allow secondary services.

24. The apparatus of claim 20, further comprising at least one management user, wherein the management user accesses the I/O device for management purposes without being on the list when the primary user instructs the I/O processor to allow management services.

25. A machine readable medium having stored therein a plurality of machine readable instructions designed to be executed by at least one processor, the machine readable instructions for building a list of users authorized to access an I/O device, the I/O device being controlled by an I/O processor, the I/O processor being part of a system area network, for sending a claim by a user for permission to access the I/O device within the system area network, for accepting the claim for permission to access the I/O device when the user is an authorized user according to the list, and for accepting requests for I/O operation from the authorized user by the I/O processor.

26. A method of handling claims for authorization to access an I/O device controlled by an I/O processor in a system area network comprising:

receiving a claim for accessing the I/O device from a user in the system area network;

determining a type of claim for the received claim;

establishing the user asserting the claim as a primary user of the I/O device within the system area network when the type of claim is primary and no previous primary claims have been processed;

accepting the claim when the claim type is authorized and the user asserting the claim is in an authorized user list; and rejecting the claim when the claim type is authorized and the user asserting the claim is not in the authorized user list.

27. The method of claim 26, further comprising accepting the claim when the claim type is secondary and secondary access to the I/O device is enabled by the primary claim.

28. The method of claim 26, further comprising accepting the claim when the claim type is management and management access to the I/O device is enabled by the primary claim.

* * * * *

UNITED STATES PATENT AND TRADEMARK OFFICE
CERTIFICATE OF CORRECTION

PATENT NO. : 6,112,263
DATED : August 29, 2000
INVENTOR(S) : Futral

It is certified that error appears in the above-identified patent and that said Letters Patent is hereby corrected as shown below:

Column 10,
Line 57, delete "Processor", insert -- processor --.

Signed and Sealed this

Twenty-first Day of May, 2002

Attest:

JAMES E. ROGAN
*Attesting Officer*     *Director of the United States Patent and Trademark Office*